United States Patent Office 2,729,712
Patented Jan. 3, 1956

2,729,712

TIRE LOW PRESSURE ALARMS

Wendell P. Sprague, Jr., Portland, Oreg.

Application June 30, 1951, Serial No. 234,543

2 Claims. (Cl. 200—61.25)

It is of value to the driver of any automobile to have warning if the pressure in any given tire drops below a given minimum, or in another situation, if it rises above a safe maximum. Of even greater importance is it to the pilot of an airplane to know whether a tire has become deflated, for if he knows it has, he may take compensatory measures during landing, which otherwise he would not take, and unless he takes such measures the airplane is likely to be wrecked. The present invention contemplates an alarm or indicator for application to individual tires, to indicate to the driver or to the pilot in the event the tire pressure changes beyond a safe limit or limits. The device may operate both for upper and for lower limits, or for either limit alone, but is represented herein simply as a low pressure alarm or indicator.

Speaking generally, the provision of devices of the general nature indicated has been proposed heretofore, but in all instances known to me the device has been of the nature of a device applied to a wheel without particular thought to the effect thereof on the wheel or its static or dynamic balance, nor, conversely, to the effect of the particular location of the device on the wheel upon the proper operation of the device itself. The present invention contemplates a particular location and orientation of the device, both with relation to the axis of the wheel and to the sense of normal rotation thereof, such as will least affect the wheel or the intended operation of the indicator device itself.

Furthermore, while such devices in the past have been applicable as attachments to a wheel, this has ordinarily been by means of special fittings or the like, attached in a place and manner that seemed most convenient, and such a device has not heretofore, so far as I am aware, been especially designed and fitted for attachment to the wheel, and for dismounting and mounting by the means and in conjunction with normal dismounting from and mounting of the wheel itself upon its hub portion. As a result of the former mountings it was often necessary to leave the entire device attached to a wheel, even though that wheel might be dismounted, for example for the purpose of changing a tire, and the spare tire supplied in place of the original itself had to have such a device mounted upon it, or else the device had to be laboriously and separately removed from the first wheel and mounted carefully on the second wheel. It is an object of the present invention to provide such as indicator, or at least the principal portion thereof which is applied to the wheel, so arranged as to be mounted by the mounting means which secure the wheel in place, and consequently to be dismounted when such wheel is itself dismounted, and thus the principal and more expensive portion of the indicator device which is mounted upon the wheel is capable of application to each wheel as the same is applied to the hub, and by the same means which secure the wheel to the hub, and no extra devices, and consequent extra expense, are required for attachment to the spare tire or wheel.

It is a further object of the invention to simplify the construction and arrangement of the device, to improve its reliability and accuracy, to make it adjustable to indicate pressure within different limits, and in general to simplify and improve the construction and arrangement of such an indicator device, and to provide one capable of attachment to an airplane wheel or to an automobile wheel, with suitable changes merely in its individual design.

These and other objects, as will appear hereinafter, are capable of accomplishment with the invention which I shall now proceed to describe.

In the accompanying drawings the invention is shown embodied in a form suitable for application to an airplane wheel, and in a typical form of arrangement and design.

Figure 1:
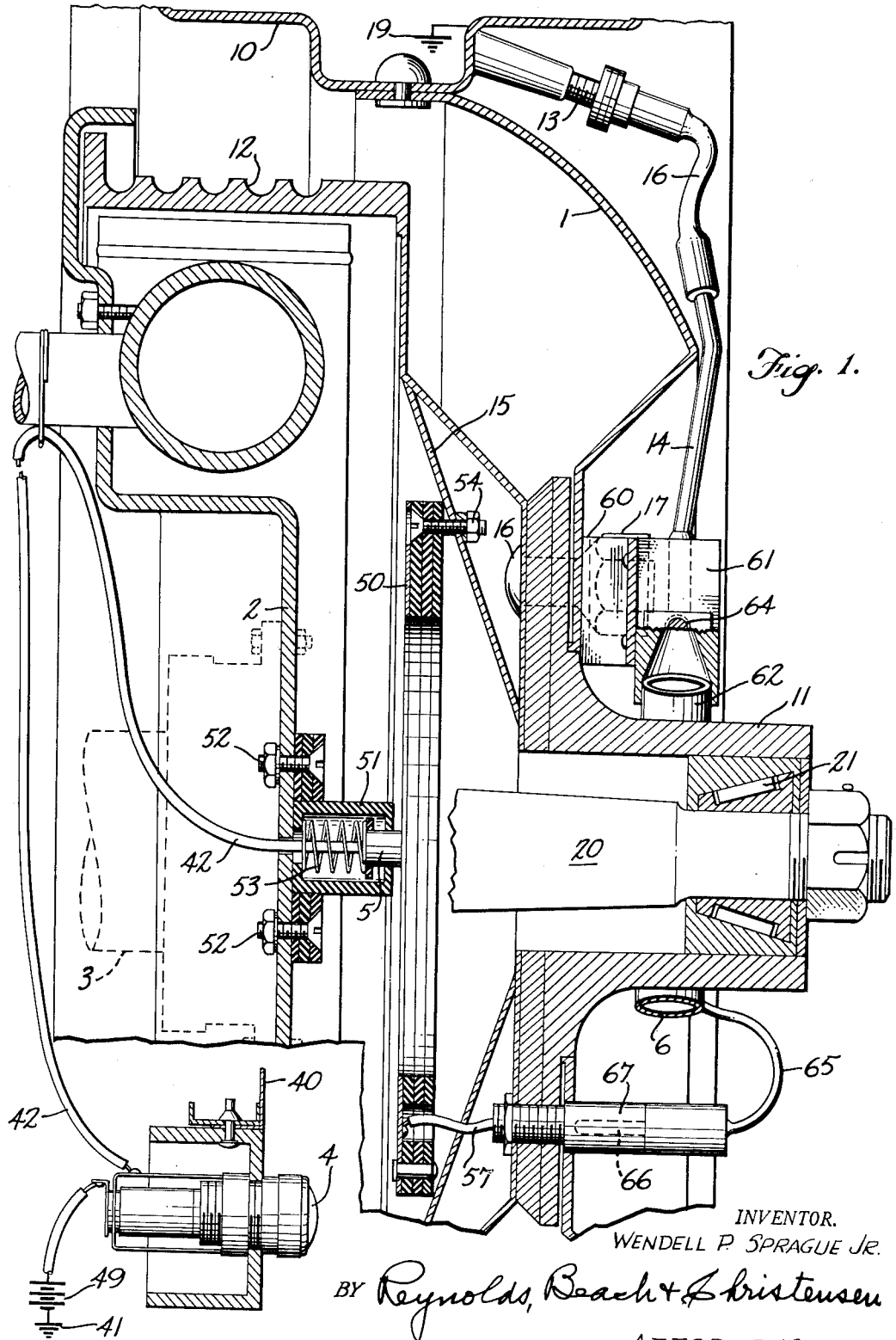
Figure 1 is an axial sectional view through a portion of a wheel, with certain portions of the indicator proper shown more or less diagrammatically. The line of section is indicated approximately at 1—1 of Figure 2.

The nonrotative hub or mounting portion of such a wheel, which carries and from which projects the spindle 20, supports the wheel proper 1, with its rim 10 and its hub housing 11, through the medium of suitable bearings indicated at 21. The brake drum 12, connected by the extension 15, rotates with the wheel, and the whole is supported by structure 3 from the airplane or the landing gear thereof (not shown). Details not essential to the understanding of the present invention are omitted.

The inflation stem 13 of the tire (not shown), which would be mounted upon the rim 10, projects to the outer face of the wheel, and would normally be closed by a suitable tire valve of conventional construction.

A portion of the instrument panel or other support positioned for observation by the pilot is intended to be represented at 40, and supported therein is an indicator or alarm 4, which may be in the nature of a lamp capable of being illuminated, the same being electrically grounded as indicated at 41, and connected by a lead 42 to a contact or wiper element 5 carried in an insulating housing 51 secured, as by the bolts 52, to the nonrotative mounting portion 2 of the wheel. The wiper element 5 is backed by a spring 53, whereby it is urged outwardly against an insulated annulus 50, which is mounted, as by the bolts 54, upon the rotative portion of the wheel, and concentrically of the latter's axis. It is obvious that the situation might be reversed and the annular member might be mounted upon the fixed portion 2, with the wiper carried upon the rotative portion of the wheel, except that the arrangement shown and described provides better balance for the wheel. It will be noted, also, that the arrangement described houses in the complemental wiper elements, protecting them from dirt. By the means just described it is possible to convey a signal electrically from a source of origination on the rotating wheel to the indicator 4 on the instrument panel.

A mounting member 60 is securable upon the rotative wheel 1, being provided with apertures to receive the normal wheel-mounting bolts 16, and to be secured by the nuts 17 which mount the wheel itself upon the rotative extension 15, which is in effect integral with the rotative hub housing 11. By this means the mounting member 60 and the members mounted thereon are readily removable or dismountable when the wheel itself is dismounted. This mounting member, through a housing 61, supports the inner or fixed end 62 of a nearly circular Bourdon tube 6, of small effective radius, which is so mounted as to be in effect concentric with the axis of the wheel's rotation, encircling the same. Its free end 63 approaches the housing 61, and mounts a switch element 64, which is connected by an electric lead 65 with a jack element 66, receivable in a socket 67, which in turn is connected by a lead 57 to a connection with the wiper ring 50. The wheel 1 being electrically grounded, as indicated diagrammatically at 19 in Figure 1, a circuit (including a current source which is diagrammatically indicated at 49) is completed through the various parts described, and through the indicator 4, whenever the switch member 64 contacts its complemental switch member 61. This can occur only when the pressure in the Bourdon tube drops below a critical value, and it is possible to regulate the screw 64 in the insulated free end 63 of the Bourdon tube to vary the value of that critical pressure.

By means of a conduit at 14, which includes a flexible portion 16, fitted upon the tire valve stem 13, it is possible to place the interior of the hollow housing 61, and hence the interior of the Bourdon tube 6, in communication with the interior of the tire through the stem 13. Thereby the Bourdon tube is made sensitive to the tire pressure, and if that pressure drops below a critical value for which point 64 is adjusted, the switch point contacts with the housing 61 and closes a circuit to give an indication at 4. At all higher pressures the switch point 64 is held by the pressure within the Bourdon tube away from contact with the grounded housing at 61, and the circuit is broken at that point. It is obvious that the switch point, by reversing its direction, might be urged by a supernormal pressure against a complemental switch point, and constitute thereby a high pressure alarm.

Figure 2:
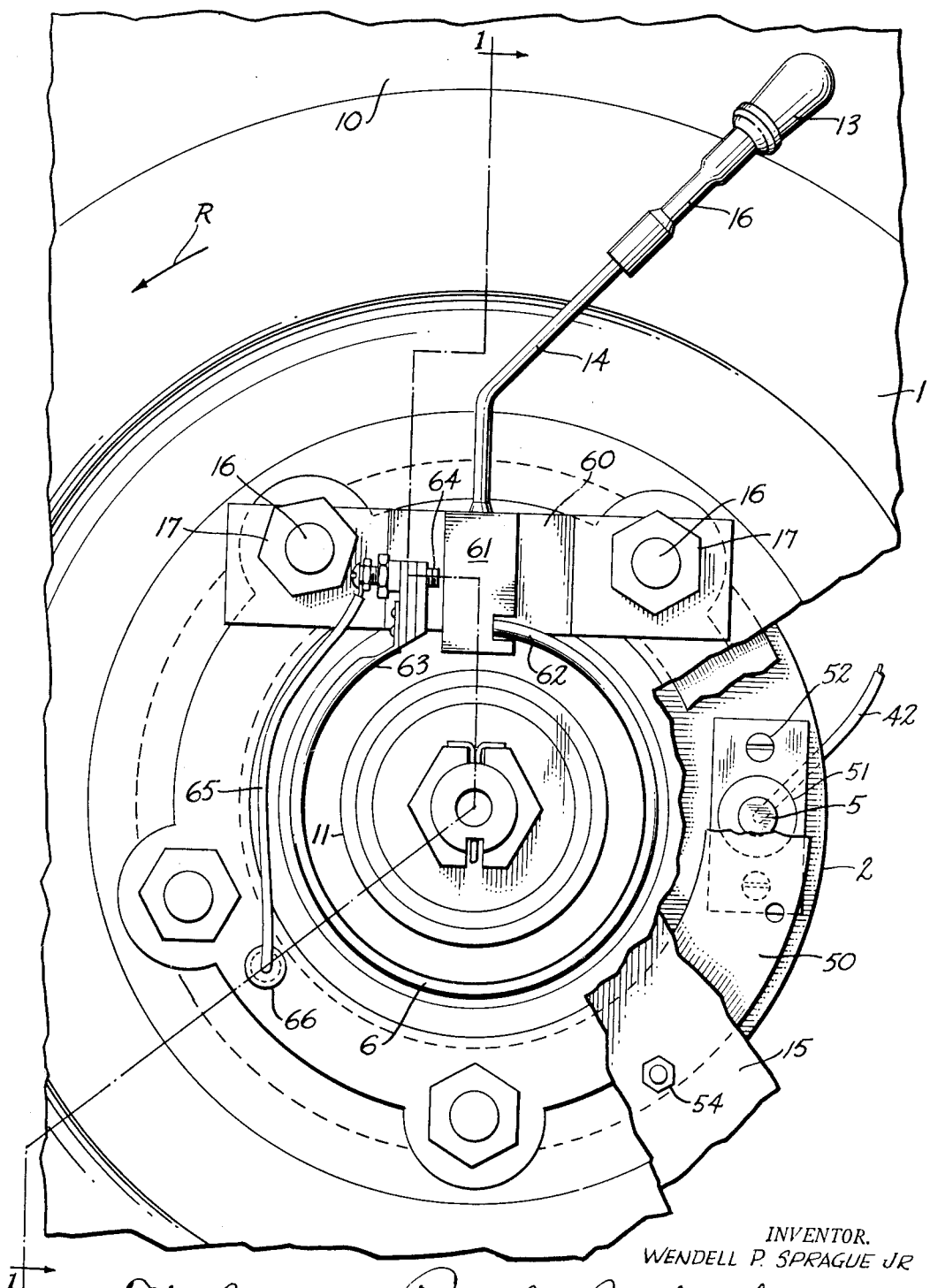
Figure 2 is a side elevational view of such a wheel, including the attachment, with various parts broken back to show underlying structures.

It is desired to point out that the Bourdon tube is of small radius, and lies close to the axis of rotation of the wheel, whereby it and its mounting 60 affect the balance of the wheel negligibly. Furthermore, the sense of rotation of the wheel is indicated by the arrow R in Figure 2, and the Bourdon tube is mounted in such fashion that its fixed end 62 trails its free end 63, and the tendency of the forces developed by rotation is to urge the free end 63 toward contact with the housing at 61, rather than the reverse. In this manner it is assured that the pressure will hold the switch points from contact normally, and that low pressure will contract the Bourdon tube to effect the closing of the alarm circuit whenever such pressure drops below a critical point.

It will be clear that the Bourdon tube and its mount at 60 are readily separable from a wheel and tire, and remounted upon a substituted wheel and tire, primarily by the bolts which mount the wheel itself in operative position. The jack 66 in such an operation pulls out of the socket 67. It is possible also to dismount even the ring 50, if need be, when a wheel is changed, but in any event the only necessary item with which each individual wheel will need to be equipped is the ring 50 and socket 67. All other parts remain in position upon or connected to the mounting member 60, with which they are dismountable and remountable upon a substituted wheel.

I claim as my my invention:

1. A switch closable by low pressure in the pneumatic tire of a wheeled vehicle, said switch including: a mounting member adapted for attachment to the wheel in the vicinity of its axis of rotation, for rotation therewith, and constituting a first terminal of the switch; a Bourdon tube the fixed end whereof is carried by said mounting member; conduit means carried by said mounting member and communicating with said Bourdon tube, and adapted for communication with the interior of the tire; said Bourdon tube being arranged to be oriented by said mounting member, when the latter is attached to the wheel, concentrically of the wheel's axis of rotation and with its free end adjacent the mounting member and ahead thereof in the normal sense of the wheel's rotation; and a second terminal of the switch carried by the free end of the Bourdon tube which, when the tube is so oriented, is located in position ahead of and adjacent the first terminal, but spaced therefrom by the distention of the tube at normal pressure within the tube and for contact therewith by contraction of the tube at a selected subnormal pressure.

2. A switch as and for use in the manner stated in claim 1, wherein the mounting member is apertured at spacings to receive the normal wheel-mounting lug bolts, whereby such mounting member is attached in proper orientation upon the wheel, and whereby it may be mounted and dismounted in conjunction with the wheel.

References Cited in the file of this patent

UNITED STATES PATENTS

| | | |
|---|---|---|
| 984,453 | Terpening | Feb. 14, 1911 |
| 1,019,557 | Terpening | Mar. 5, 1912 |
| 2,550,041 | Cozzolino et al. | Apr. 24, 1951 |
| 2,565,073 | Fuehring | Aug. 21, 1951 |